United States Patent
Fridman

(10) Patent No.: US 8,827,303 B1
(45) Date of Patent: Sep. 9, 2014

(54) FOLDABLE ELEVATED PERSONAL SHOPPING CART

(71) Applicant: Florence Fridman, Brooklyn, NY (US)

(72) Inventor: Florence Fridman, Brooklyn, NY (US)

( * ) Notice: Subject to any disclaimer, the term of this patent is extended or adjusted under 35 U.S.C. 154(b) by 0 days.

(21) Appl. No.: 13/986,948

(22) Filed: Jun. 18, 2013

(51) Int. Cl.
*B62B 5/00* (2006.01)
*B62B 3/02* (2006.01)

(52) U.S. Cl.
CPC ..................................... *B62B 3/027* (2013.01)
USPC ......................................... 280/638; 280/47.35

(58) Field of Classification Search
CPC .............. B62B 5/00; B62B 3/02; B62B 3/06; B62B 3/0618
See application file for complete search history.

(56) References Cited

U.S. PATENT DOCUMENTS

| | | | |
|---|---|---|---|
| 2,946,601 A * | 7/1960 | Branning et al. ............... | 280/46 |
| 3,456,763 A | 7/1969 | Close | |
| 3,513,944 A | 5/1970 | McConnaughhay | |
| 4,116,456 A | 9/1978 | Stover et al. | |
| 4,621,969 A | 11/1986 | Bergall | |
| 4,655,466 A * | 4/1987 | Hanaoka .................. | 280/47.371 |
| 4,888,833 A * | 12/1989 | Garcia et al. ........................ | 4/480 |
| 5,004,252 A | 4/1991 | Kraper | |
| 5,299,659 A * | 4/1994 | Imbeault et al. .............. | 414/592 |
| 5,863,054 A | 1/1999 | Flores | |
| 7,322,586 B1 * | 1/2008 | Zettel .......................... | 280/47.26 |
| 8,172,255 B1 * | 5/2012 | Martin .......................... | 280/651 |
| 2002/0125662 A1 * | 9/2002 | Magness .......................... | 280/30 |
| 2004/0256818 A1 * | 12/2004 | Amsili ......................... | 280/47.29 |
| 2007/0085285 A1 * | 4/2007 | Lindsay ....................... | 280/47.34 |
| 2008/0014066 A1 * | 1/2008 | Kolesa et al. .................. | 414/469 |
| 2009/0232633 A1 * | 9/2009 | Stamps et al. ................. | 414/814 |
| 2011/0180772 A1 * | 7/2011 | Katz et al. ..................... | 254/93 H |
| 2012/0286484 A1 * | 11/2012 | Gonzalez ......................... | 280/30 |
| 2012/0319063 A1 * | 12/2012 | Hailston et al. .................... | 254/2 |
| 2013/0106073 A1 * | 5/2013 | Gamard et al. .............. | 280/79.2 |
| 2013/0126806 A1 * | 5/2013 | Van Seumeren .............. | 254/2 R |
| 2013/0292925 A1 * | 11/2013 | Shindelar et al. ............. | 280/651 |

* cited by examiner

Primary Examiner — Jeffrey J Restifo
Assistant Examiner — Erez Gurari

(57) ABSTRACT

The present invention provides a cart having a metal tubular frame having a lift apparatus attached thereto, a hydraulic pump system which integrates into the back of the lift apparatus and which is enclosed in a slotted tube within a metal casing, a foot pedal, wherein the foot pedal is fastened to the hydraulic pump system via a hinge together with a lift platform. The lift apparatus is joined to flat panels and attached to the tubular metal frame forming the back and a single metal panel comprising the front. Side panels are hinged for the purpose of folding and held in place by screws, wheels which are attached with two axles, the axles go through the tubing frame, one axle anterior with a first set of two wheels and one axle posterior below a handle with a second set of two wheels optionally, larger than the first set of wheels.

It will help people with picking up their packages with ease and comfortability. It is good with people with disabilities such as arthritis. It is easier, a better way with less stress and difficulty. Also it is portable, collapsible, and easy to store.

6 Claims, 6 Drawing Sheets

FOLDABLE ELEVATED PERSONAL SHOPPING CART

BACKGROUND OF THE INVENTION

FIELD OF THE INVENTION

The present invention relates to personal shopping carts. More particular, this present invention relates to an elevated foldable personal shopping cart for allowing personal items to be picked up in an easier manner.

DESCRIPTION OF THE PRIOR ART

Personal shopping carts are well known in the prior art. More specifically, shopping carts are known to comprise known configurations notwithstanding the many designs to fulfill certain purposes. Prior art in the personal shopping cart field includes U.S. Pat. Nos. 4,116,456, 4,621,969, 5,004,252, 3,456,763, 5,863,054, and 3,513,944 and U.S. Application Publication No. 20120286484.

What is missing from the known personal shopping carts is a personal shopping cart that can elevate the items to make it much easier for a person to pick up the items, which is also foldable as in the present invention.

SUMMARY OF THE INVENTION

The present invention provides a cart having a metal tubular frame having a lift apparatus attached thereto, a hydraulic pump system which integrates into the back of the lift apparatus and which is enclosed in a slotted tube within a metal casing, a foot pedal, wherein the foot pedal is fastened to the hydraulic pump system via a hinge together with a lift platform. The lift apparatus is joined to flat panels and attached to the tubular metal frame forming the back and a single metal panel comprising the front. Side panels are hinged for the purpose of folding and held in place by screws, wheels which are attached with two axles, the axles go through the tubing frame, one axle anterior with a first set of two wheels and one axle posterior below a handle with a second set of two wheels optionally, larger than the first set of wheels.

BRIEF DESCRIPTION OF THE FIGURES

The accompanying drawings illustrate the present invention.

DETAILED DESCRIPTION OF THE INVENTION

Figure 1:
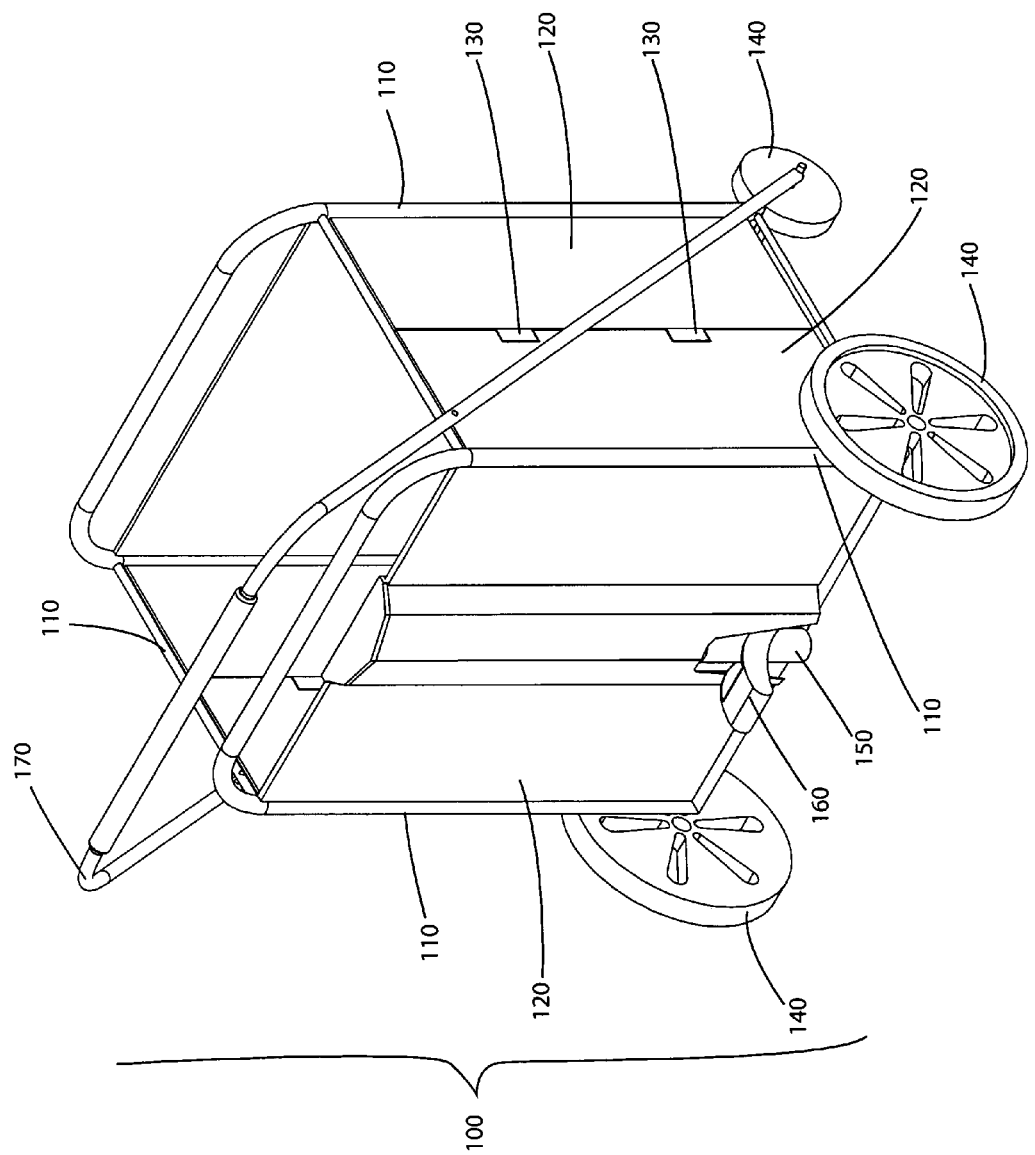
FIG. 1 is a perspective view of the cart.
Figure 2:
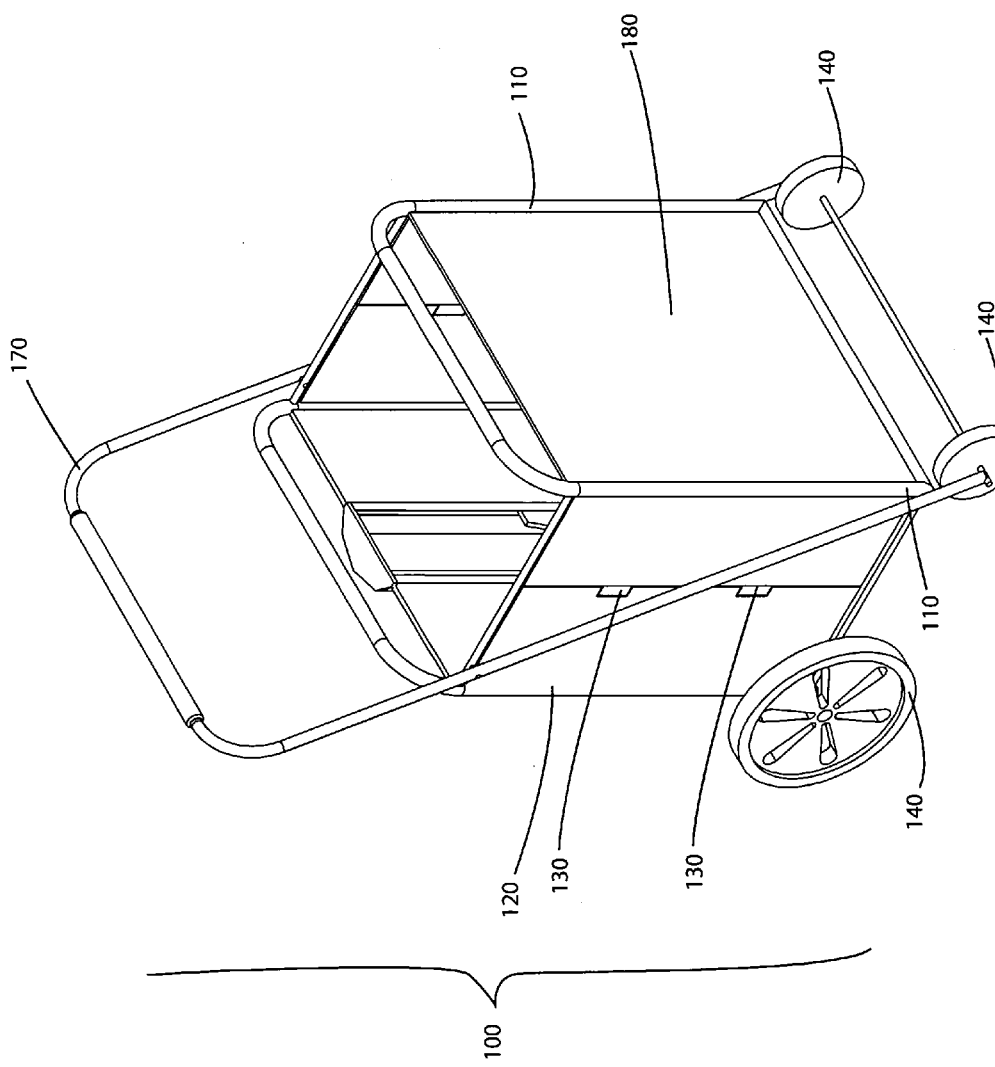
FIG. 2 is another perspective view of the cart.

In FIGS. 1 and 2, depicts a cart 100 comprising a metal tubular frame 110 attached to a lift apparatus 310, hydraulic pump system 150 integrates into the back of the lift apparatus 310 which is enclosed in a slotted tube 320 within a metal casing, a foot pedal 160, wherein the foot pedal 160 is bolted to the hydraulic pump system 150 via a hinge together with a lift platform 300, the lift apparatus 310 is joined to flat metal side panels 120 and attached to the tubular metal frame 110 forming the back and a single flat metal panel 180 comprising the front, the side panels 120 are hinged 130 for the purpose of folding and held in place by screws, wheels 140 which are attached with two axles, the axles go through the tubing frame 110, one axle anterior with a first set of two wheels 140 and one axle posterior below a handle 170 with a second set of two wheels 140 optionally, larger than the first set of wheels 140.

Figure 3:
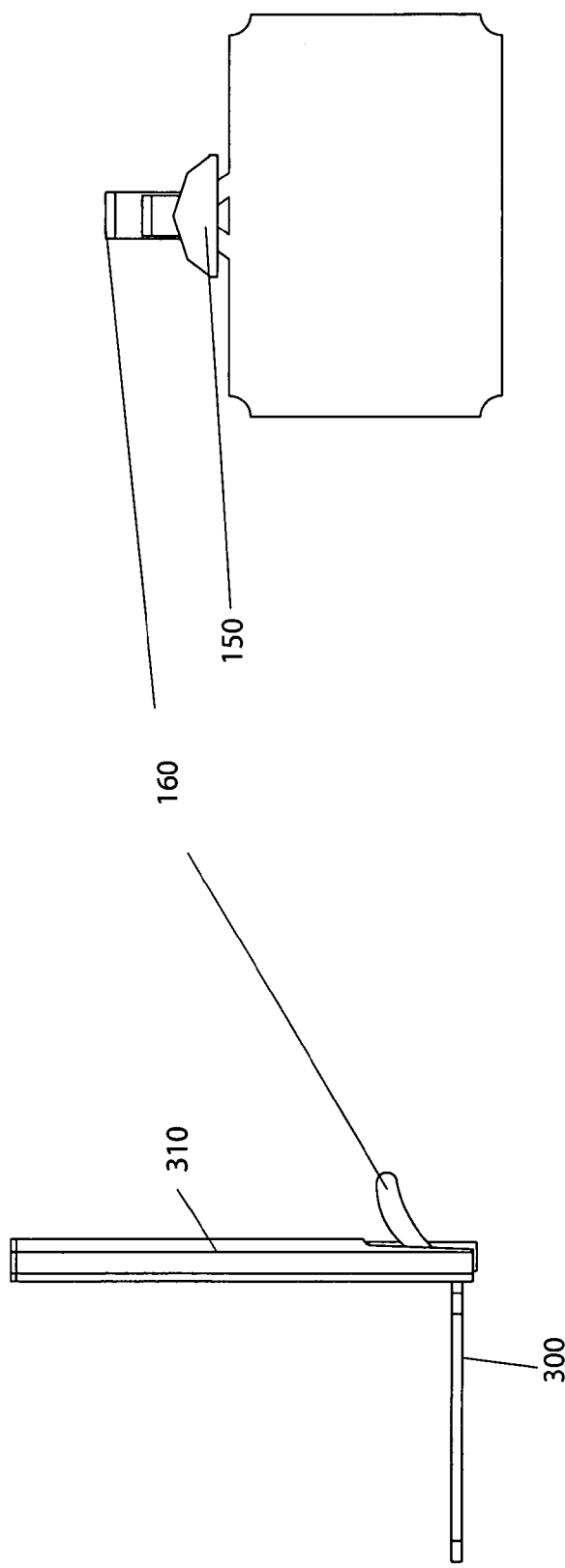
FIG. 3 shows the mechanism of the foot pedal in conjunction with the pump.
Figure 4:
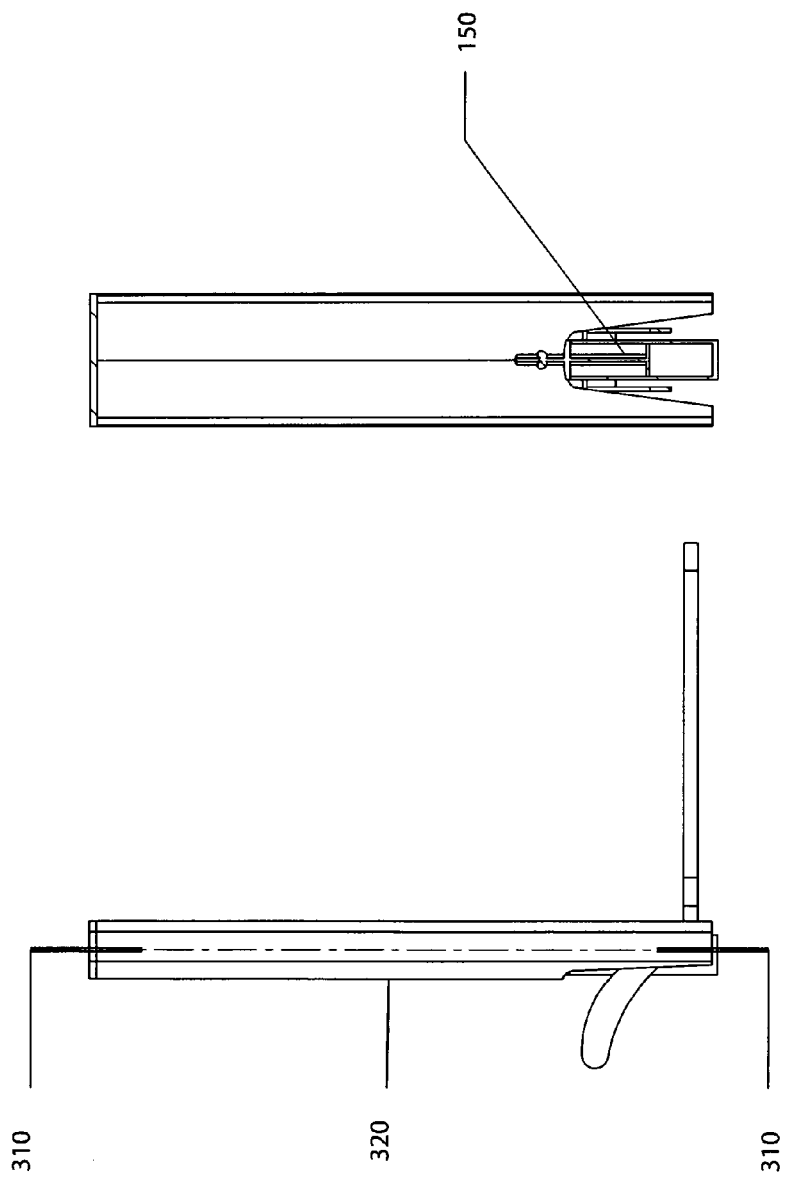
FIG. 4 shows a close up view of the hydraulic pump system.
Figure 5:
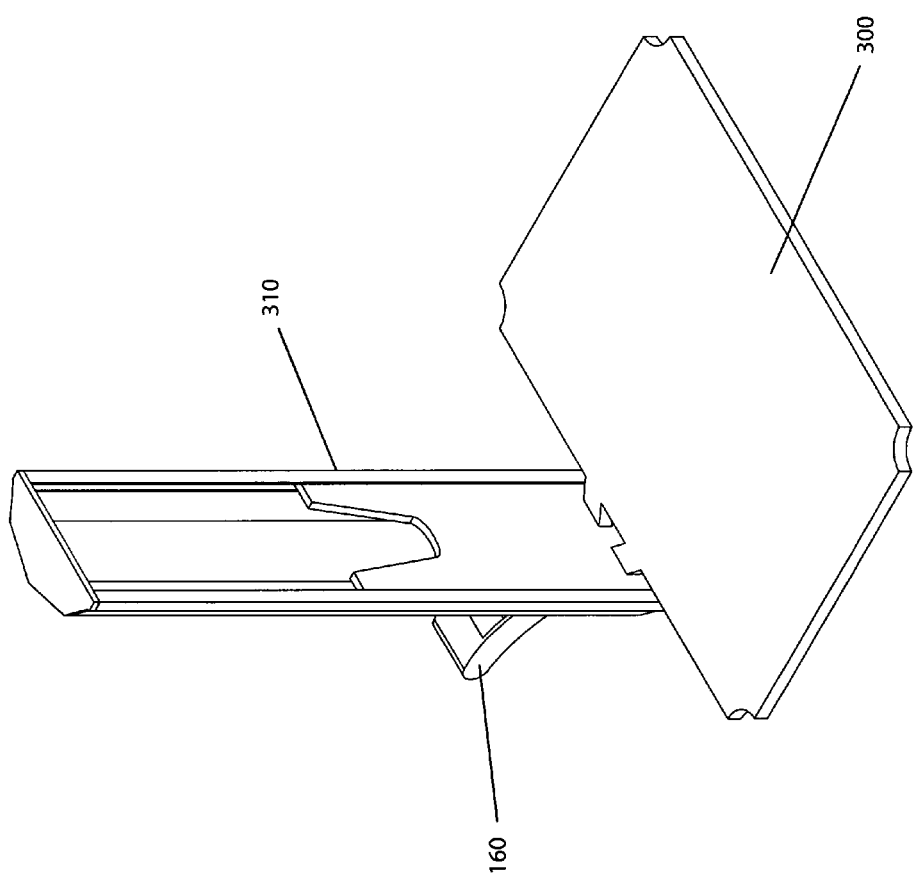
FIG. 5 shows a close up view of the lift platform and the lift apparatus.

FIGS. 3, 4, and 5 show a more close up view how the lift platform 300, lift apparatus 310, foot pedal 160, and the pump 150 are connected.

When the foot pedal 160 is pressed, the hydraulic pump 150 which contains hydraulic fluid, foot petal 160, and lift platform 300 operate together to move the lift apparatus 310 up and down to lift and bring down items, making it possible to raise a load capacity ranging from 50 pounds all the way up to 250 pounds. When the foot pedal 160 is pressed three times, the lift apparatus 310 elevates up and when pressed down only 2 times, the lift apparatus 310 goes down.

The side panels 120 have hinges 130, held by screws, which allows the cart 100 to be in a foldable position and also unfolds.

Figure 6:
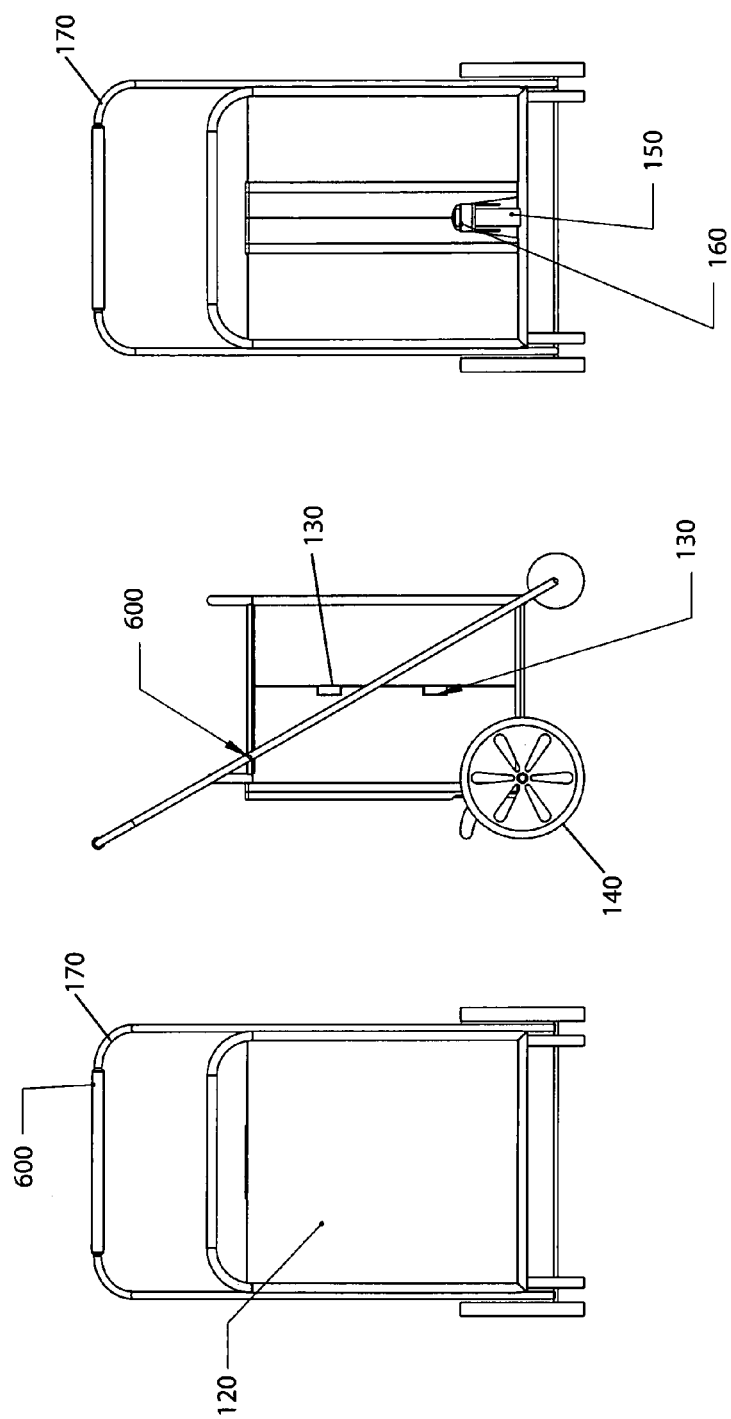
FIG. 6 shows various components of the cart such as the rubber on the handle, hole for the handle, hinges, pump, and the foot pedal.

In FIG. 6, depicts on the handle 170, there can also be a rubber 610 on the handle. The handle 170 also has a hole 600 for the handle allowing the handle to slide through the hole. The cart 100 may be used, but not limited to grocery shopping purposes and for light personal use, for example, to lift a gallon of paint, shopping bags, or just regular groceries.

It will help people with picking up their packages with ease and comfortability. It is good, for example, with people with disabilities such as arthritis. It is easier, a better way with less stress and difficulty. Also, it is portable, collapsible, and easy to store.

While the foregoing written description of the invention enables one of ordinary skill to make and use what is considered presently to be, the best mode thereof, those of ordinary skill will understand and appreciate the existence of variations, combinations, and equivalents of the specific embodiment, method, and examples herein.

What is claimed is:

1. A cart comprising a metal tubular frame having a lift apparatus attached thereto, a hydraulic pump system which integrates into the back of the lift apparatus and which is enclosed in a slotted tube within a metal casing, a foot pedal, wherein the foot pedal is fastened to the hydraulic pump system via a hinge together with a lift platform, wherein the lift apparatus is joined to flat panels and attached to the tubular metal frame forming the back and a single metal panel comprising the front, side panels are hinged for the purpose of folding and held in place by screws, wheels which are attached with two axles, the axles go through the tubing frame, one axle anterior with a first set of two wheels and one axle posterior below a handle with a second set of two wheels.

2. The cart of claim 1, wherein the lift platform is comprised of metal.

3. The cart of claim 1, wherein when the foot pedal is pressed three times, the lift platform elevates up.

4. The cart of claim 1, wherein when the foot pedal is pressed down 2 times, the lift platform elevates down.

5. The cart of claim 1, wherein the side panels are comprised of metal.

6. The cart of claim 1, wherein the axle posterior below the handle with a second set of two wheels is larger than the first set of wheels.

* * * * *